(12) United States Patent
Pisklak et al.

(10) Patent No.: US 11,352,544 B2
(45) Date of Patent: Jun. 7, 2022

(54) STRENGTH RETROGRESSION MITIGATION MATERIALS FOR CEMENT COMPOSITIONS

(71) Applicant: HALLIBURTON ENERGY SERVICES, INC., Houston, TX (US)

(72) Inventors: Thomas Jason Pisklak, Cypress, TX (US); Samuel Jason Lewis, The Woodlands, TX (US); Paul Joseph Jones, Houston, TX (US); William Cecil Pearl, Jr., Spring, TX (US); Stephanie Ruiz, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 343 days.

(21) Appl. No.: 16/605,781

(22) PCT Filed: Dec. 3, 2018

(86) PCT No.: PCT/US2018/063608
§ 371 (c)(1),
(2) Date: Oct. 16, 2019

(87) PCT Pub. No.: WO2020/117190
PCT Pub. Date: Jun. 11, 2020

(65) Prior Publication Data
US 2021/0332284 A1    Oct. 28, 2021

(51) Int. Cl.
*C09K 8/467*  (2006.01)
*E21B 33/14*  (2006.01)
*C04B 28/18*  (2006.01)
*C04B 111/20* (2006.01)

(52) U.S. Cl.
CPC ............ *C09K 8/467* (2013.01); *C04B 28/188* (2013.01); *E21B 33/14* (2013.01); *C04B 2111/2084* (2013.01)

(58) Field of Classification Search
CPC .......... C98K 8/467; E21B 33/14; C09K 8/467
USPC ......................................... 166/292
See application file for complete search history.

(56) References Cited

U.S. PATENT DOCUMENTS

| 8,226,763 B2 | 7/2012 | Beuchle et al. |
| 8,226,764 B2 | 7/2012 | Beuchle et al. |
| 8,382,892 B2 | 2/2013 | Beuchle et al. |

(Continued)

FOREIGN PATENT DOCUMENTS

WO    2014053699 A1    4/2014

OTHER PUBLICATIONS

International Search Report and Written Opinion; PCT Application No. PCT/US2018/063608; dated Aug. 28, 2019.

*Primary Examiner* — Zakiya W Bates
*Assistant Examiner* — Ashish K Varma
(74) *Attorney, Agent, or Firm* — Polsinelli PC (57) ABSTRACT

Cement compositions for use in subterranean wellbores that include a monophase amorphous hydraulic binder material (MAHBM). The MAHBM may include a plurality of particles having a silica core and an amorphous coating substantially surrounding the silica core. The coating may comprise a plurality of amorphous particles, such as α-dicalcium silicate hydrate nanoparticles or microparticles. The MAHBM may be used as a strength retrogression mitigating additive in a cement composition or used as a high temperature cement.

16 Claims, 7 Drawing Sheets

(56) References Cited

U.S. PATENT DOCUMENTS

| | | | |
|---|---|---|---|
| 2011/0041737 A1* | 2/2011 | Beuchle | C04B 7/3453 |
| | | | 106/739 |
| 2014/0238275 A1* | 8/2014 | Patil | C04B 28/04 |
| | | | 106/733 |
| 2017/0210670 A1* | 7/2017 | Muthusamy | C04B 28/021 |
| 2017/0349485 A1* | 12/2017 | Horta | C04B 7/345 |
| 2021/0332284 A1* | 10/2021 | Pisklak | C09K 8/467 |

\* cited by examiner

STRENGTH RETROGRESSION MITIGATION MATERIALS FOR CEMENT COMPOSITIONS

CROSS-REFERENCE TO RELATED APPLICATIONS

This application is a national stage entry of PCT/US2018/063608 filed Dec. 3, 2018, said application is expressly incorporated herein in its entirety.

FIELD

The present disclosure relates to strength retrogression mitigating agents and materials for cement compositions in a wellbore environment.

BACKGROUND

In order to access downhole hydrocarbon sources, a wellbore is typically drilled deep within the earth through various underground rock formations. After drilling is terminated, and prior to stimulation and production processes, a steel casing is often provided along a length of the wellbore. The steel casing assists in maintaining the integrity of the wellbore as well as controlling the flow of fluids, for instance preventing wellbore fluids from leaking into freshwater underground reservoirs.

The casing is often made up of a large number of individual tubulars referred to as joints, together forming a casing string. The casing is cemented in place, for instance by pumping a cement composition into the annulus between the casing and a surface of the wellbore. The cement is then allowed to set and form a sheath around the casing. Accordingly, the cement adds an additional barrier as well as provides support to the casing and maintains it in place.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure. It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Disclosed herein are high temperature resistant cement compositions and strength retrogression mitigation agents or additives for cement compositions which may be used in a wellbore environment. Specifically, the present disclosure is directed to the use of monophase amorphous hydraulic binder materials (MAHBMs) as a high temperature resistant cement or as an additive to prevent detrimental effects to Portland cement at high temperatures (e.g., >230° F.). The presently disclosed, high temperature resistant cement compositions comprising MAHBMs are effective in helping to ensure wellbore integrity at high temperatures and for minimizing risk of isolation failures or the need for remedial wellbore work due to retrogression related issues.

According to at least one aspect of the present disclosure, a cement composition for use in a subterranean wellbore is provided. The cement composition may include a hydraulic cement, water, and a monophase amorphous hydraulic binder material (MAHBM). In at least some instances, the MAHBM is added to the cement composition as a strength retrogression mitigating additive. The MAHBM may comprise a plurality of particles having a silica core and an amorphous coating substantially surrounding the silica core. In at least some instances, the coating is a α-dicalcium silicate hydrate coating and the silica core is a crystalline silica core. In at least some instances, the coating comprises a plurality of amorphous α-dicalcium silicate hydrate nanoparticles or microparticles. The cement composition may include, for example, from about 5% to about 40% MAHBM by weight.

According to at least one other aspect of the present disclosure, a cement composition for use in a subterranean wellbore is provided that includes primarily MAHBM. In such cases, MAHBM may be the majority component of the cement composition. For example, the cement composition may include at least 50% by weight of the cement composition. In at least some instances, such cement compositions does not include Portland cement.

According to at least one aspect of the present disclosure, a method of cementing a portion of a subterranean wellbore is provided. The method may include providing a cement composition comprising a monophase amorphous hydraulic binder material (MAHBM) and introducing the cement composition into a subterranean wellbore. The method may further include introducing the cement composition into a portion of the wellbore having a temperature of at least 230° F. The method may further include introducing the cement composition into an annulus between a casing and a wall of the wellbore; and allowing the cement composition to set. The cement composition used in the method may include water sufficient to form a cement slurry. The method may further include introducing the cement composition into the wellbore using one or more pumps. In some instances, the cement composition used in the method may include at least 50% by weight MAHBM. In other instances, the cement composition may include from about 5% to about 40% by weight MAHBM.

Figure 1:
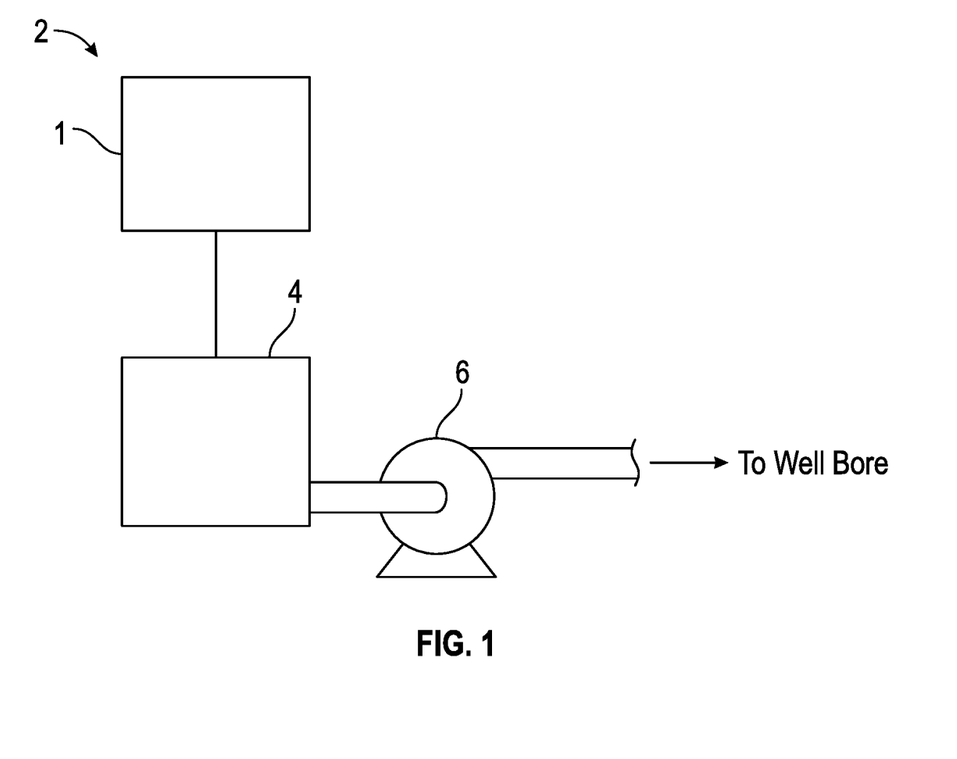
FIG. 1 illustrates a system for preparation and delivery of a cement composition to a well bore, in accordance with aspects of the present disclosure.
Figure 2:
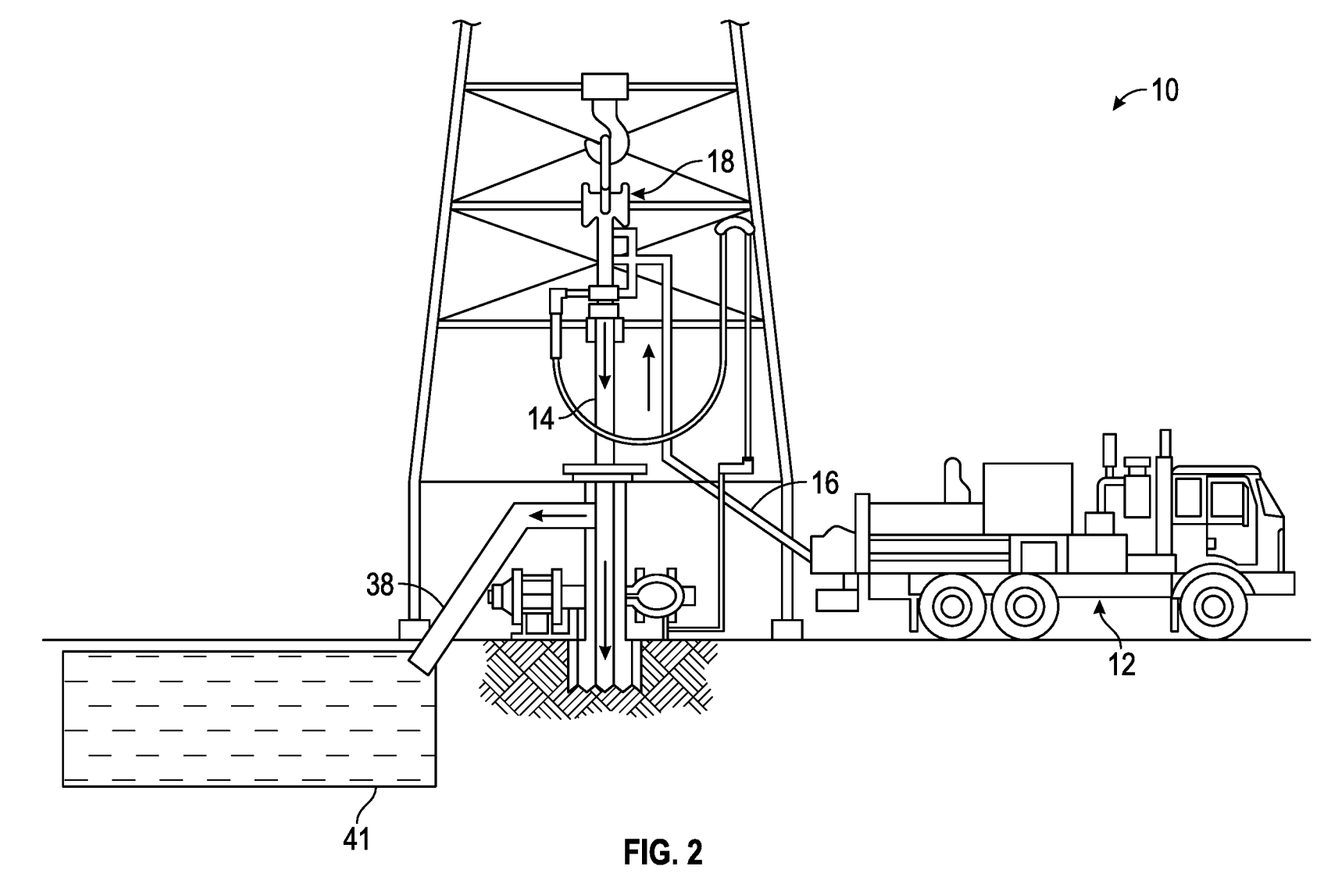
FIG. 2 illustrates surface equipment that may be used in placement of a cement composition in a well bore, in accordance with aspects of the present disclosure.
Figure 3:
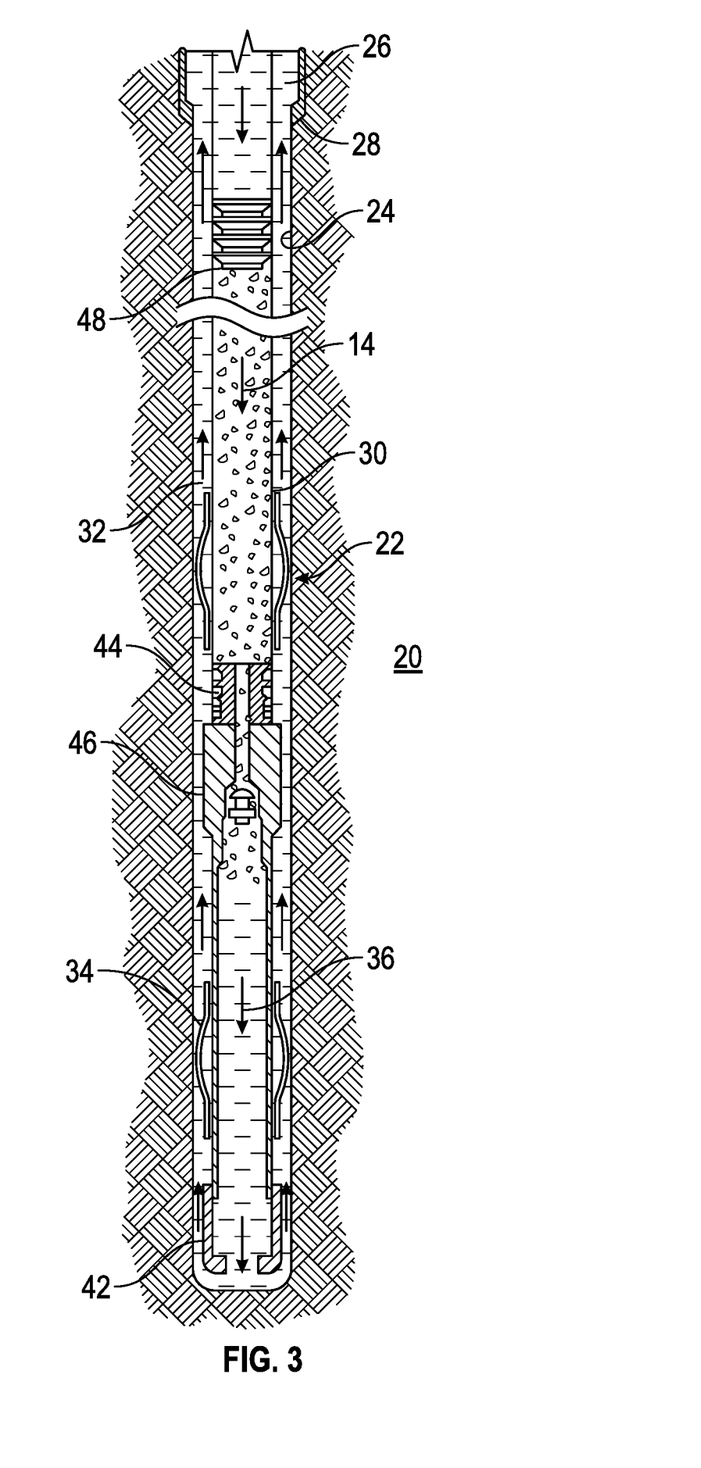
FIG. 3 illustrates placement of a cement composition into a well bore annulus, in accordance with aspects of the present disclosure.

FIGS. 1-3 describe the mixing and pumping of a cement composition, such as a cement slurry, including the presently disclosed cement compositions having MAHBMs. FIG. 1 is a diagram of a system that may be used in the preparation of a cement composition in accordance with example embodiments that will now be described. FIG. 1 illustrates a system 2 for preparation of a cement composition and delivery to a well bore in accordance with certain embodiments. The suspension agent 1, which may be held in a container, may be pumped or added in liquid form to the cement and water being mixed in mixing equipment 4 thereby forming a cement composition. As shown, the cement composition (in the form of a cement slurry) may be contained and mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

An example technique and system for placing a cement composition into a subterranean formation will now be described with reference to FIGS. 2 and 3. FIG. 2 is a diagram illustrating surface equipment 10 that may be used in the placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Turning now to FIG. 3, FIG. 3 is a diagram illustrating the cement composition 14 being introduced into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line, such as flow line 38 depicted in FIG. 2, and be deposited, for example, in one or more retention pits 41 (e.g., a mud pit), as shown on FIG. 2. Referring again to FIG. 3, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 3, the bottom plug 44 is shown on the landing collar 46. In the illustrated embodiment, a top plug 48 may be introduced into the well bore 22 behind the cement composition 14. The top plug 48 may separate the cement composition 14 from a displacement fluid and also push the cement composition 14 through the bottom plug 44.

Figure 4:
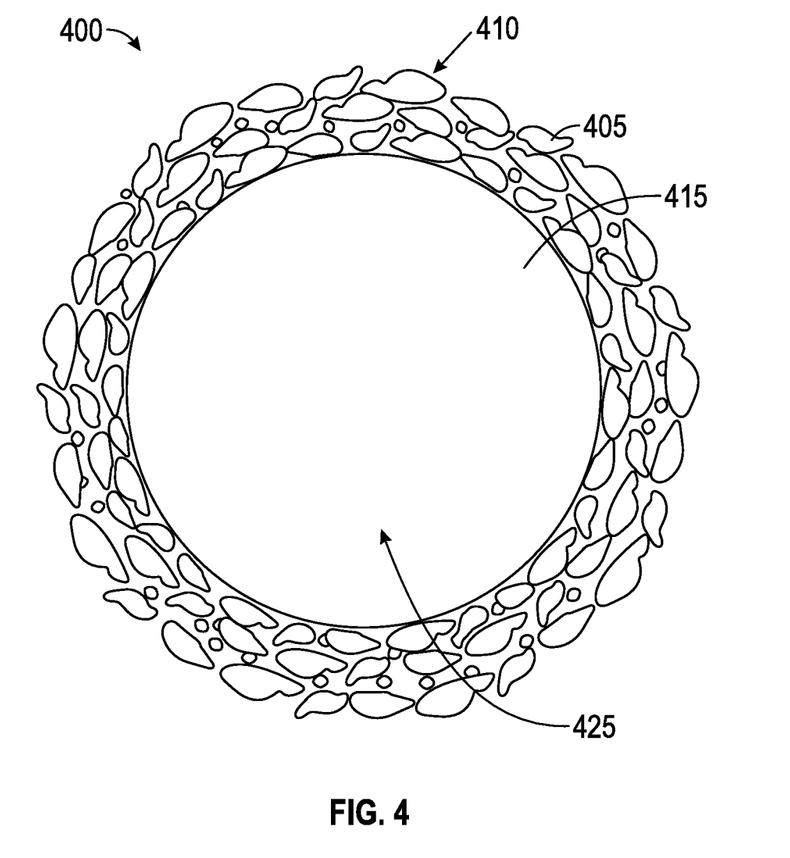
FIG. 4 is an illustration depicting the general structure and morphology of monophase amorphous hydraulic binder materials (MAHBMs), in accordance with aspects of the present disclosure.

FIG. 4 depicts the general structure and morphology of monophase amorphous hydraulic binder material (MAHBMs). As depicted in FIG. 4, MAHBMs 400 are composed of a silica core 425 surrounded by a coating 410 comprised of substantially amorphous materials. The silica core 425 may comprise one or more particles of a material selected from the group consisting of crystalline silica, quartz, volcanic glass, diatomaceous earth, fly ash or other silica-based waste materials, bio ash, amorphous silica, and any combination thereof. The coating 410 may be selected from the group consisting of amorphous α-dicalcium silicate hydrate (α-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Coating 410 may be comprised of a plurality of substantially amorphous particles 405. In at least some instances, the MAHBMs 400 may be nanoparticles and/or microparticles of partially dehydrated and reorganized amorphous α-dicalcium silicate hydrate (α-$C_2SH$) coated on larger crystalline silica or quartz particles 415. The silica core 425 may have a particle size of from about 5 μm to about 500

μm. In some instances, the silica core may be characterized by a particle size of from about 7 μm to about 50 μm, or from about 5 μm to about 100 μm, or from about 5 μm to about 250 μm. It has unexpectedly been found that MAHBMs performs well as a high temperature cement or as a strength retrogression additive in Portland cement, thereby preventing degradation of Portland cement at high temperatures. The use of MAHBMs in cement compositions produces beneficial results due to the high temperature resistant amorphous coating 410 surrounding the silica core 425. In particular, the structure-property relationship of MAHBMs make it ideal for use as either a high temperature resistant cement or as an additive to prevent degradation of Portland cement at high temperatures (e.g., >230° F.).

During the curing of cement compositions, $\alpha$-$C_2$SH forms a cured cement sheath as a result of the conversion of calcium silicate hydrate gel (CSH gel) to $\alpha$-$C_2$SH. The formation of $\alpha$-$C_2$SH is detrimental to the integrity of the cement sheath. Specifically, $\alpha$-$C_2$SH has a greater degree of crystallinity than CSH gel, which corresponds to a higher grain density. As $\alpha$-$C_2$SH forms, this densification process manifests itself by the formation of higher porosity, increased permeability, and a loss of compressive strength in the cured cement sheath. However, when $\alpha$-$C_2$SH is added prior to the cement hardening the adverse effects associated with the formation of $\alpha$-$C_2$SH from CSH gel are avoided since the $\alpha$-$C_2$SH does not undergo the densification process to tricalciumsilicate hydrate within the hardened cement until temperatures much higher than conventional cementing operations (e.g., 480° F.). As a result, the use of MAHBMs having a silica core 425 and an amorphous coating 410 in cement compositions reduces the detrimental effects of the conversion of CSH gel to $\alpha$-$C_2$SH, thereby producing a cured cement having beneficial properties, including enhanced integrity and reduced strength retrogression.

Figure 5:
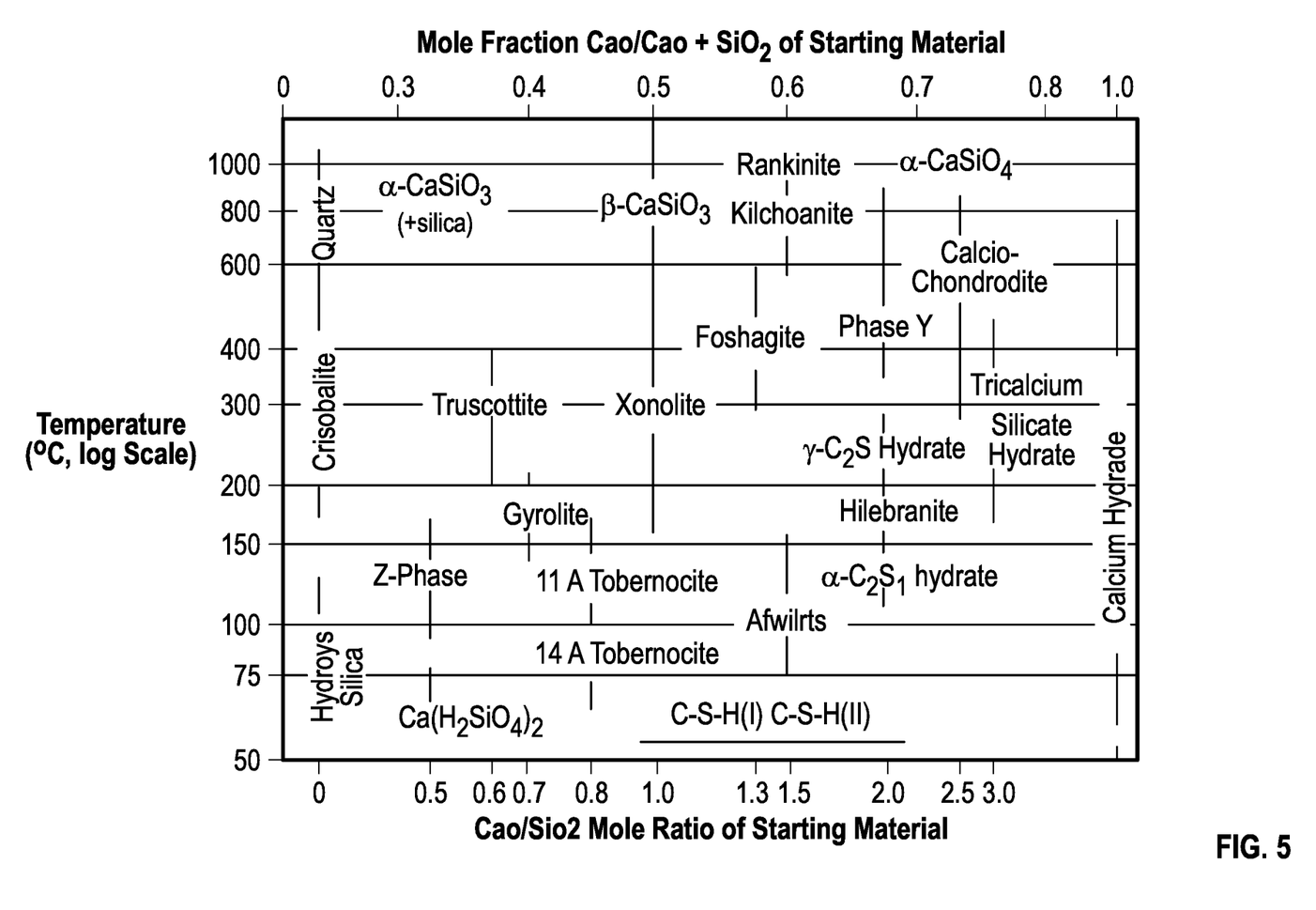
FIG. 5 is an illustration depicting crystalline species formation conditions based on CaO/SiO$_2$ ratio and temperature, in accordance with aspects of the present disclosure.

In addition, the presently disclosed MAHBMs are characterized by a $CaO/SiO_2$ molar ratio that is close to 1.0 which is within the desired range of from about 0.8 to about 1.5 that is known to reduce the degradation of the cement at temperatures above 230° F. due to compositional and morphological changes brought about by high temperatures, as shown in FIG. 5. In some instances, the MAHBM is characterized by an average $CaO/SiO_2$ molar ratio of from about 0.1 to about 1.5, or from about 0.8 to about 1.5, or from about 0.8 to about 1.2, or from about 0.9 to about 1.1.

Crystalline silica may be used to reduce strength retrogression by lowering the $CaO/SiO_2$ molar ratio. However, there are inherent drawbacks to the use of crystalline silica. First, crystalline silica has a low water requirement which may lead to unstable slurries which require the use of expensive high temperature suspending aids. Second, crystalline silica is un-reactive at low temperatures which leads to low compressive strength development at low temperatures which is a critical parameter in operations such as steam injection wells.

The unique properties of MAHBMs can overcome both of these problems with using crystalline silica. As shown in FIG. 4, the amorphous coating 410 is made up of nano to micro scale particles which have a high surface area which leads to a much higher water requirement (65%) than crystalline silica (35%). Having a high water requirement results in at least two benefits. First, a high water requirement imparts viscosity on cement slurries with low water content, which often negates the need for expensive high temperature suspending aids. Second, more water can be added to the same amount of materials producing a great yield of cement and consequently reducing COGS of the cement slurry. Accordingly, MAHBMs impart beneficial properties to cement slurries as shown in the following Examples. In particular, Example 1 demonstrates that MAHBMs are self-reactive at low temperatures, while Example 2 demonstrates that MAHBMs function well as a supplement cementitious material (SCR). The reactive properties of MAHBMs, along with their strength retrogression mitigating properties, result in MAHBMs and cement compositions that comprise MAHBMs being ideal for operations that call for a low curing temperature but high temperature resistance, such as steam injection wells.

According to one aspect of the present disclosure, cement compositions that include MAHBMs as the primary component or as the majority component are disclosed. Such MAHBM-based cement compositions may contain for example, at least 40% by weight MAHBMs, or at least 50% by weight MAHBMs, or from about 45% to about 65% by weight MAHBMs, or from about 50% to about 75% by weight MAHBMs, or from about 55% to about 65% by weight MAHBMs, or from about 57% to about 62% by weight MAHBMs. In some instances, the MAHBM-based cement compositions do not include Portland cement.

The MAHBM-based cement compositions may from about 25% to about 60% by weight water, or from about 30% to about 50% by weight water, or from about 35% to about 45% by weight water. In some instances, the MAHBM-based cement compositions may also include a polymeric dispersant, a suspending agent, and/or a cement retarder. In some instances, the MAHBM-based cement compositions do not include a suspending agent.

According to another aspect of the present disclosure, MAHBMs may be used as a strength retrogression mitigating additive in a cement composition. In such instances, the cement composition may include a hydraulic cement, water, and a MAHBM. Such cement compositions may include from about 5% to about 70% by weight MAHBM, or from about 5% to about 40% by weight MAHBM, or from about 10% to about 30% by weight MAHBM, or from about 10% to about 20% by weight MAHBM. In at least some instances, the hydraulic cement may be Portland cement.

The cement compositions having MAHBM as a strength retrogression mitigating additive may also include from about 1% to about 70% by weight hydraulic cement, or from about 10% to about 40% by weight hydraulic cement, or from about 15% to about 35% by weight hydraulic cement, or from about 15% to about 25% by weight hydraulic cement, or from about 15% to about 20% by weight hydraulic cement.

The cement compositions having MAHBM as a strength retrogression mitigating additive may also include from about 25% to about 80% water, or from about 25% to about 60% by weight water, or from about 30% to about 50% by weight water, or from about 35% to about 45% by weight water. The cement compositions may also include from about 10% to about 40% by weight fly ash, or from about 15% to about 35% by weight fly ash, or from about 20% to about 30% by weight fly ash.

In some instances, the cement compositions having MAHBM as a strength retrogression mitigating additive may also include a fluid loss additive, a suspending agent, and/or a defoaming agent. In some instances, the cement compositions do not include a suspending agent.

The following examples are intended to be illustrative only, and are not intended to be, nor should they be construed as limiting in any way of the scope of the present disclosure.

Example 1—Use of MAHBMs as a MAHBM-Based Cement

A cement slurry was mixed according to API procedures using the formulation shown in Table 1.

TABLE 1

| Material | Weight (g) |
| --- | --- |
| water | 578.4 |
| MAHBMs | 780.1 |
| cement dispersant | 7.8 |
| suspending agent | 0.5 |

The cement slurry was then poured into 2"×4" cylindrical molds and placed in a water bath at 140° F. After curing for seven days, the samples were removed from the water bath, demolded and the mechanical properties were measured. The results of the mechanical property tests are provided in Table 2.

TABLE 2

| Property | Result |
| --- | --- |
| density of set cement (ppg) | 12.9 |
| compressive strength (psi) | 404 |
| Young's modulus (Mpsi) | 0.7 |
| tensile strength (psi) | 56 |

In addition to forming a competent cement sheath, high temperature cement must also be able to withstand degradation due to compositional and morphological changes brought about by temperatures greater than about 230° F. In some instances, crystalline silica may be added to Portland cement in order to mitigate degradation of cement properties at high temperatures. The addition of crystalline silica to Portland cement reduces the $CaO/SiO_2$ ratio from about 3.0 to a desired level of about 0.8 to about 1.5. Formulating cement slurries having a $CaO/SiO_2$ ratio in this range helps to ensure that the crystalline species formed at high temperature are not detrimental to the cement properties. The $CaO/SiO_2$ ratio of MAHBM cement is about 1.0, which is well within the preferred range of about 0.8 to about 1.5. This ratio, along with the compositional benefits of having a silica core 425 and an amorphous coating 410, as depicted in FIG. 4, makes MAHBM-based cements ideally suited to resist degradation at high temperatures and produce a cement that functions as a competent barrier for the life of the well.

Example 1 demonstrates that MAHBMs are self-reactive and capable of being used as a cement without the addition of other cementitious materials. Although MAHBM-based cements do not attain very high compressive strength at low temperatures, the self-reactivity of the MAHBMs will increase with increasing temperature and MAHBM-based cements are capable of forming a competent cement sheath at high temperatures.

Example 2—MAHBM-Based Cement

A cement slurry was mixed according to API procedures according to the formulation shown in Table 3.

TABLE 3

| Material | Weight (g) |
| --- | --- |
| MAHBMs | 450 |
| HR-800 ™ cement retarder | 0.7 |
| water | 292.5 |

Figure 6:
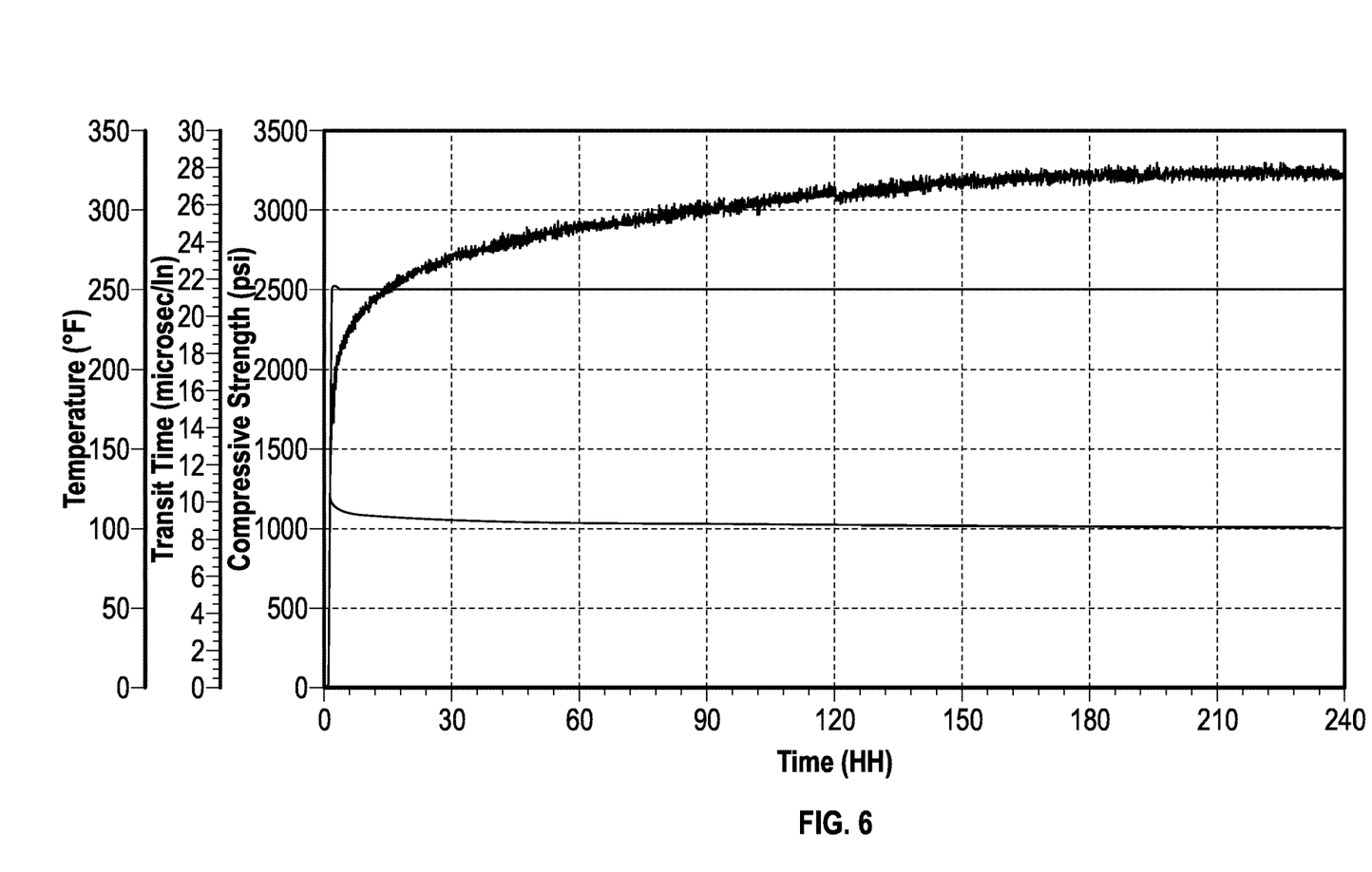
FIG. 6 is a graph illustrating Ultrasonic Cement Analyzer (UCA) data for a MAHBM cement composition at 250° F., in accordance with aspects of the present disclosure.
Figure 7:
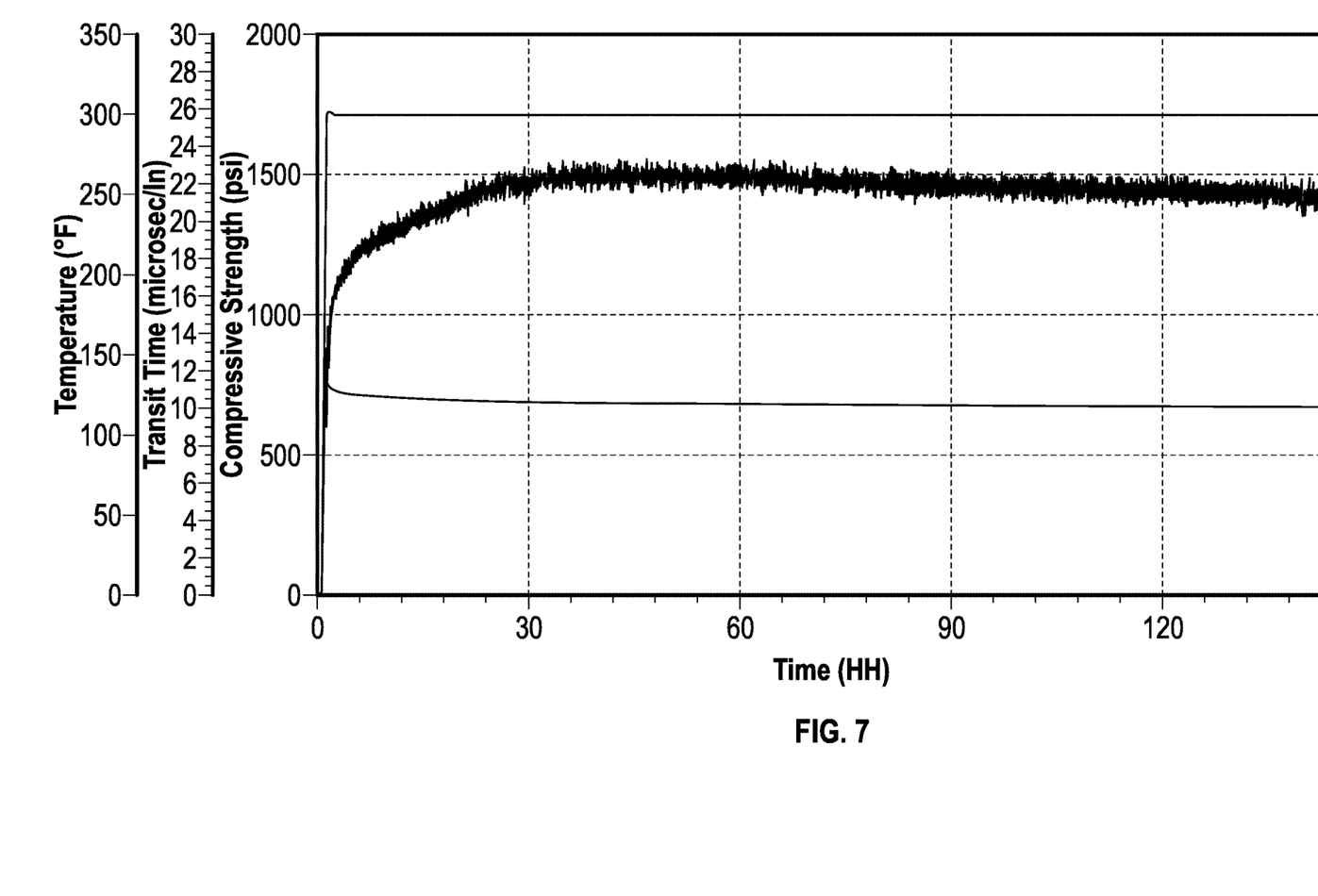
FIG. 7 is a graph illustrating Ultrasonic Cement Analyzer (UCA) data for a MAHBM cement composition at 300° F., in accordance with aspects of the present disclosure.

Two UCAs were poured and heated to 250° F. and 300° F. at 3000 psi and allowed to remain at temperature for ten and six days respectively. The results of the UCA test at 250° F. are shown in FIG. 6 while the results of the UCA test at 300° F. are shown in FIG. 7. X-ray diffraction of the MAHBM cements cured at 250° F. and 300° F. did not show the presence of conventional strength retrogression phases or evidence of densification.

Example 3—MAHBMs as an Additive in Cements

A cement slurry was mixed according to API procedures using the formulation shown in Table 4 with MAHBMs comprising 25.2% of the dry blend.

TABLE 4

| Material | Specific Gravity | Weight (g) |
| --- | --- | --- |
| Type I/II Portland cement | 3.2 | 175.1 |
| Pozmix fly ash type F | 2.2 | 243.2 |
| MAHBMs | 2.8 | 141.1 |
| fluid loss additive | 1.2 | 2.8 |
| suspending agent | 1.5 | 0.6 |
| defoaming agent | 2.3 | 1.4 |
| water | 1.0 | 370.6 |

The resulting slurry had a calculated density of 13.2 ppg and was poured into a UCA. After curing for seven days 220° F., the ultimate compressive strength of the sample was measured to be 2580 psi, as shown in Table 5. The results shown in Table 5 indicates that the cement composition demonstrated higher reactivity under the same conditions than fly ash or volcanic glass, both of which are known to be more reactive than crystalline silica (quartz).

TABLE 5

| Material | UCA Compressive Strength (psi) |
| --- | --- |
| Cement Composition of Example 3 | 2580 |
| Fly Ash, Type F | 1710 |
| Volcanic Glass | 2167 |

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims.

Numerous examples are provided herein to enhance understanding of the present disclosure. A specific set of statements are provided as follows.

Statement 1: A cement composition for use in a subterranean wellbore comprising: a hydraulic cement; water; and a monophase amorphous hydraulic binder material (MAHBM).

Statement 2: The cement composition according to Statement 1, wherein the MAHBM is a strength retrogression mitigating additive.

Statement 3: The cement composition according to Statement 1 or Statement 2, wherein the MAHBM comprises a plurality of particles having a silica core and an amorphous coating substantially surrounding the silica core, wherein the coating comprises a material selected from the group consisting of amorphous α-dicalcium silicate hydrate (α-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Statement 4: The cement composition according to Statement 3, wherein the silica core comprises one or more particles of a material selected from the group consisting of crystalline silica, quartz, volcanic glass, diatomaceous earth, fly ash or other silica-based waste materials, bio ash, amorphous silica, and any combination thereof.

Statement 5: The cement composition according to Statement 3 or Statement 4, wherein the coating comprises amorphous α-dicalcium silicate hydrate.

Statement 6: The cement composition according to any one of the preceding Statements 3-5, wherein the coating comprises a plurality of amorphous α-dicalcium silicate hydrate nanoparticles or microparticles.

Statement 7: The cement composition according to any one of the preceding Statements 3-6, wherein the silica core is characterized by a particle size of from about 5 μm to about 500 μm, or from about 7 μm to about 50 μm, or from about 5 μm to about 100 μm, or from about 5 μm to about 250 μm.

Statement 8: The cement composition according to any one of the preceding Statements 1-7, wherein the cement composition comprises from about 5% to about 40% MAHBM by weight, or from about 5% to about 70% MAHBM by weight.

Statement 9: The cement composition according to any one of the preceding Statements 1-7, wherein the cement composition comprises from about 10% to about 20% MAHBM by weight.

Statement 10: The cement composition according to any one of the preceding Statements 1-7, wherein the cement composition comprises from about 10% to about 30% MAHBM by weight.

Statement 11: The cement composition according to any one of the preceding Statements 1-10, wherein the cement composition further comprises from about 10% to about 40% by weight hydraulic cement, or from about 1% to about 70% by weight hydraulic cement.

Statement 12: The cement composition according to any one of the preceding Statements 1-10, wherein the cement composition further comprises from about 15% to about 35% by weight hydraulic cement.

Statement 13: The cement composition according to any one of the preceding Statements 1-10, wherein the cement composition further comprises from about 15% to about 25% by weight hydraulic cement.

Statement 14: The cement composition according to any one of the preceding Statements 1-10, wherein the cement composition further comprises from about 15% to about 20% by weight hydraulic cement.

Statement 15: The cement composition according to any one of the preceding Statements 1-14, wherein the cement composition further comprises from about 25% to about 60% by weight water, or from about 25% to about 80% by weight water.

Statement 16: The cement composition according to any one of the preceding Statements 1-14, wherein the cement composition further comprises from about 30% to about 50% by weight water.

Statement 17: The cement composition according to any one of the preceding Statements 1-14, wherein the cement composition further comprises from about 35% to about 45% by weight water.

Statement 18: The cement composition according to any one of the preceding Statements 1-17, wherein the cement composition further comprises from about 10% to about 40% by weight fly ash.

Statement 19: The cement composition according to any one of the preceding Statements 1-17, wherein the cement composition further comprises from about 15% to about 35% by weight fly ash.

Statement 20: The cement composition according to any one of the preceding Statements 1-17, wherein the cement composition further comprises from about 20% to about 30% by weight fly ash.

Statement 21: The cement composition according to any one of the preceding Statements 1-20, further comprising a fluid loss additive.

Statement 22: The cement composition according to any one of the preceding Statements 1-21, further comprising a suspending agent.

Statement 23: The cement composition according to any one of the preceding Statements 1-21, wherein the cement composition does not include a high temperature suspending agent.

Statement 24: The cement composition according to any one of the preceding Statements 1-23, further comprising a defoaming agent.

Statement 25: The cement composition according to any one of the preceding Statements 1-24, wherein the MAHBM is characterized by an average $CaO/SiO_2$ molar ratio of from about 0.1 to about 1.5.

Statement 26: The cement composition according to any one of the preceding Statements 1-24, wherein the MAHBM is characterized by an average $CaO/SiO_2$ molar ratio of from about 0.8 to about 1.2.

Statement 27: The cement composition according to any one of the preceding Statements 1-24, wherein the MAHBM is characterized by an average $CaO/SiO_2$ molar ratio of from about 0.9 to about 1.1.

Statement 28: The cement composition according to any one of the preceding Statements 1-27, wherein the hydraulic cement is Portland cement.

Statement 29: A cement composition for use in a subterranean wellbore comprising: a monophase amorphous hydraulic binder material (MAHBM); and water; wherein the MAHBM comprises at least 50% by weight of the cement composition, or at least 40% by weight of the cement composition.

Statement 30: The cement composition according to Statement 29, wherein the cement composition comprises from about 50% to about 70% by weight MAHBM.

Statement 31: The cement composition according to Statement 29, wherein the cement composition comprises from about 55% to about 65% by weight MAHBM, or from about 45% to about 65% by weight MAHBM.

Statement 32: The cement composition according to any one of the preceding Statements 29-31, wherein the cement composition does not include Portland cement.

Statement 33: The cement composition according to any one of the preceding Statements 29-32, further comprising a polymeric dispersant.

Statement 34: The cement composition according to any one of the preceding Statements 29-33, further comprising a suspending agent.

Statement 35: The cement composition according to any one of the preceding Statements 29-33, wherein the cement composition does not include a suspending agent.

Statement 36: The cement composition according to any one of the preceding Statements 29-35, further comprising a cement retarder.

Statement 37: The cement composition according to any one of the preceding Statements 29-36, wherein the cement composition further comprises from about 25% to about 60% by weight water.

Statement 38: The cement composition according to any one of the preceding Statements 29-36, wherein the cement composition further comprises from about 30% to about 50% by weight water.

Statement 39: The cement composition according to any one of the preceding Statements 29-36, wherein the cement composition further comprises from about 35% to about 45% by weight water.

Statement 40: The cement composition according to any one of the preceding Statements 29-39, wherein the MAHBM comprises a plurality of particles having a silica core and a coating substantially surrounding the silica core, wherein the coating comprises a material selected from the group consisting of amorphous α-dicalcium silicate hydrate ($\alpha$-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Statement 41: The cement composition according to Statement 40, wherein the silica core comprises one or more particles of a material selected from the group consisting of crystalline silica, quartz, volcanic glass, diatomaceous earth, fly ash or other silica-based waste materials, bio ash, amorphous silica, and any combination thereof.

Statement 42: The cement composition according to Statement 40 or Statement 41, wherein the coating comprises amorphous α-dicalcium silicate hydrate.

Statement 43: The cement composition according to any one of the preceding Statements 40-42, wherein the coating comprises a plurality of amorphous α-dicalcium silicate hydrate nanoparticles or microparticles.

Statement 44: The cement composition according to any one of the preceding Statements 40-43, wherein the silica core is characterized by a particle size of from about 5 μm to about 500 μm, or from about 7 μm to about 50 μm, or from about 5 μm to about 100 μm, or from about 5 μm to about 250 μm.

Statement 45: The cement composition according to any one of the preceding Statements 29-44, wherein the MAHBM is characterized by an average $CaO/SiO_2$ molar ratio of from about 0.1 to about 1.5.

Statement 46: The cement composition according to any one of the preceding Statements 29-44, wherein the MAHBM is characterized by an average $CaO/SiO_2$ molar ratio of from about 0.8 to about 1.2.

Statement 47: The cement composition according to any one of the preceding Statements 29-44, wherein the MAHBM is characterized by an average $CaO/SiO_2$ molar ratio of from about 0.9 to about 1.1.

Statement 48: A method comprising: providing a cement composition comprising a monophase amorphous hydraulic binder material (MAHBM); and introducing the cement composition into a wellbore.

Statement 49: The method according to Statement 48, further comprising introducing the cement composition into a portion of the wellbore having a temperature of at least 230° F.

Statement 50: The method according to Statement 48 or Statement 49, further comprising introducing the cement composition into an annulus between a casing and a wall of the wellbore; and allowing the cement composition to set.

Statement 51: The method according to any one of the preceding Statements 48-50, wherein the cement composition comprises a water sufficient to form a slurry, the method further comprising introducing the cement composition into the wellbore using one or more pumps.

Statement 52: The method according to any one of the preceding Statements 48-51, wherein the cement composition comprises a hydraulic cement.

Statement 53: The method according to any one of the preceding Statements 48-52, wherein the MAHBM comprises at least 50% by weight of the cement composition, or at least 40% by weight of the cement composition.

Statement 54: The cement composition according to any one of the preceding Statements 48-53, wherein the cement composition comprises from about 50% to about 70% by weight MAHBM.

Statement 55: The cement composition according to any one of the preceding Statements 48-53, wherein the cement composition comprises from about 55% to about 65% by weight MAHBM, or from about 45% to about 65% by weight MAHBM.

Statement 56: The cement composition according to any one of the preceding Statements 48-53, wherein the cement composition does not include Portland cement.

Statement 57: The cement composition according to any one of the preceding Statements 48-53, wherein the cement composition comprises from about 5% to about 40% MAHBM by weight.

Statement 58: The cement composition according to any one of the preceding Statements 48-53, wherein the cement composition comprises from about 10% to about 20% MAHBM by weight.

Statement 59: The cement composition according to any one of the preceding Statements 48-53, wherein the cement composition comprises from about 10% to about 30% MAHBM by weight.

Statement 60: The cement composition according to any one of the preceding Statements 48-59, wherein the MAHBM comprises a plurality of particles having a silica core and a coating substantially surrounding the silica core, wherein the coating comprises a material selected from the group consisting of amorphous α-dicalcium silicate hydrate ($\alpha$-$C_2SH$), amorphous tricalcium silicate ($C_3S$), amorphous dicalcium silicate ($C_2S$), amorphous tricalcium aluminate ($C_3A$), amorphous tricalcium silicate hydrate ($C_3SH$), amorphous dicalcium silicate hydrate ($C_2SH$), amorphous tricalcium aluminate hydrate ($C_3AH$), and any combination thereof.

Statement 61: The cement composition according to Statement 60, wherein the silica core comprises one or more particles of a material selected from the group consisting of crystalline silica, quartz, volcanic glass, diatomaceous earth, fly ash or other silica-based waste materials, bio ash, amorphous silica, and any combination thereof.

Statement 62: The cement composition according to Statement 60 or Statement 61, wherein the coating comprises amorphous α-dicalcium silicate hydrate.

Statement 63: The cement composition according to any one of the preceding Statements 60-62, wherein the coating comprises a plurality of amorphous α-dicalcium silicate hydrate nanoparticles or microparticles.

Statement 64: The cement composition according to any one of the preceding Statements 60-63, wherein the silica core is characterized by a particle size of from about 5 μm to about 500 μm, or from about 7 μm to about 50 μm, or from about 5 μm to about 100 μm, or from about 5 μm to about 250 μm.

Statement 65: The cement composition according to any one of the preceding Statements 48-64, wherein the MAHBM is characterized by an average CaO/SiO$_2$ molar ratio of from about 0.1 to about 1.5.

Statement 66: The cement composition according to any one of the preceding Statements 48-64, wherein the MAHBM is characterized by an average CaO/SiO$_2$ molar ratio of from about 0.8 to about 1.2.

Statement 67: The cement composition according to any one of the preceding Statements 48-64, wherein the MAHBM is characterized by an average CaO/SiO$_2$ molar ratio of from about 0.9 to about 1.1.

What is claimed is:

1. A cement composition for use in a subterranean wellbore comprising:
a hydraulic cement;
water; and
a monophase amorphous hydraulic binder material (MAHBM);
wherein MAHBM comprises a plurality of particles having a silica core and a coating substantially surrounding the silica core;
wherein the silica core comprises one or more particles of a material selected from the group consisting of crystalline silica, quartz, volcanic glass, diatomaceous earth, fly ash or other silica-based waste materials, bio ash, amorphous silica, and any combination thereof; and
wherein the coating comprises a material selected from the group consisting of amorphous α-dicalcium silicate hydrate (α-C$_2$SH), amorphous tricalcium silicate hydrate (C$_3$SH), amorphous dicalcium silicate hydrate (C$_2$SH), amorphous tricalcium aluminate hydrate (C$_3$AH), and any combination thereof.

2. The cement composition according to claim 1, wherein the MAHBM is a strength retrogression mitigating additive.

3. The cement composition according to claim 1, wherein the coating comprises amorphous α-dicalcium silicate hydrate.

4. The cement composition according to claim 1, wherein the coating comprises a plurality of amorphous α-dicalcium silicate hydrate nanoparticles or microparticles.

5. The cement composition according to claim 1, wherein the silica core is characterized by a particle size of from about 5 μm to about 500 μm.

6. The cement composition according to claim 1, wherein the cement composition comprises from about 5% to about 70% MAHBM by weight.

7. The cement composition according to claim 6, wherein the cement composition further comprises from about 1% to about 70% by weight hydraulic cement and from about 25% to about 80% by weight water.

8. The cement composition according to claim 1, wherein the MAHBM is characterized by an average CaO/SiO$_2$ molar ratio of from about 0.1 to about 1.5.

9. A cement composition for use in a subterranean wellbore comprising:
a monophase amorphous hydraulic binder material (MAHBM); and
water;
wherein the MAHBM comprises at least 40% by weight of the cement composition
wherein MAHBM comprises a plurality of particles having a silica core and a coating substantially surrounding the silica core;
wherein the silica core comprises one or more particles of a material selected from the group consisting of crystalline silica, quartz, volcanic glass, diatomaceous earth, fly ash or other silica-based waste materials, bio ash, amorphous silica, and any combination thereof; and
wherein the coating comprises a material selected from the group consisting of amorphous α-dicalcium silicate hydrate (α-C$_2$SH), amorphous tricalcium silicate hydrate (C$_3$SH), amorphous dicalcium silicate hydrate (C$_2$SH), amorphous tricalcium aluminate hydrate (C$_3$AH), and any combination thereof.

10. The cement composition according to claim 9, wherein the cement composition comprises from about 45% to about 65% by weight MAHBM.

11. The cement composition according to claim 9, wherein the silica core has an average particle size of from about 5 μm to about 500 μm; wherein the coating comprises a plurality of amorphous α-dicalcium silicate hydrate nanoparticles or microparticles; and wherein the MAHBM is characterized by an average CaO/SiO$_2$ molar ratio of from about 0.1 to about 1.5.

12. A method comprising:
providing a cement composition comprising a monophase amorphous hydraulic binder material (MAHBM); and
introducing the cement composition into a wellbore;
wherein MAHBM comprises a plurality of particles having a silica core and a coating substantially surrounding the silica core;
wherein the silica core comprises one or more particles of a material selected from the group consisting of crystalline silica, quartz, volcanic glass, diatomaceous earth, fly ash or other silica-based waste materials, bio ash, amorphous silica, and any combination thereof; and
wherein the coating comprises a material selected from the group consisting of amorphous α-dicalcium silicate hydrate (α-C$_2$SH), amorphous tricalcium silicate hydrate (C$_3$SH), amorphous dicalcium silicate hydrate (C$_2$SH), amorphous tricalcium aluminate hydrate (C$_3$AH), and any combination thereof.

13. The method according to claim 12, further comprising introducing the cement composition into a portion of the wellbore having a temperature of at least 230° F.

14. The method according to claim 12, further comprising introducing the cement composition into an annulus between a casing and a wall of the wellbore; and
allowing the cement composition to set.

15. The method according to claim 12, wherein the cement composition comprises a hydraulic cement and water sufficient to form a slurry, the method further comprising introducing the cement composition into the wellbore using one or more pumps.

16. The method according to claim 12, wherein the MAHBM comprises at least 40% by weight of the cement composition.

* * * * *